United States Patent
Owen et al.

(10) Patent No.: US 9,345,270 B2
(45) Date of Patent: May 24, 2016

(54) WATER-ACTIVATED THERMOCHROMIC MATERIALS

(71) Applicant: CHROMATIC TECHNOLOGIES INC., Colorado Springs, CO (US)

(72) Inventors: Timothy J. Owen, Colorado Springs, CO (US); Terrill Scott Clayton, Colorado Springs, CO (US)

(73) Assignee: CHROMATIC TECHNOLOGIES, INC., Colorado Springs, CO (US)

( * ) Notice: Subject to any disclaimer, the term of this patent is extended or adjusted under 35 U.S.C. 154(b) by 0 days.

(21) Appl. No.: 14/308,402

(22) Filed: Jun. 18, 2014

(65) Prior Publication Data

US 2014/0366238 A1 Dec. 18, 2014

Related U.S. Application Data

(60) Provisional application No. 61/836,563, filed on Jun. 18, 2013.

(51) Int. Cl.
| | |
|---|---|
| *B41M 7/00* | (2006.01) |
| *A41B 1/08* | (2006.01) |
| *A41D 27/08* | (2006.01) |
| *C09D 7/00* | (2006.01) |
| *A41D 13/00* | (2006.01) |

(52) U.S. Cl.
CPC ............... *A41B 1/08* (2013.01); *A41D 13/0015* (2013.01); *A41D 27/08* (2013.01); *B41M 7/0009* (2013.01); *C09D 7/00* (2013.01); *A41D 2600/10* (2013.01); *B41M 2205/18* (2013.01)

(58) Field of Classification Search
CPC ........ B41M 1/26; B41M 7/00; B41M 7/0009; B41M 2205/18; A41D 2600/10
USPC ................................. 503/201; 2/69
See application file for complete search history.

(56) References Cited

U.S. PATENT DOCUMENTS

| | | | |
|---|---|---|---|
| 4,642,250 A | 2/1987 | Spector | |
| 4,720,301 A | 1/1988 | Kito et al. | |
| 5,219,625 A | 6/1993 | Matsunami | |
| 5,281,570 A | 1/1994 | Hasegawa et al. | |
| 5,435,010 A | 7/1995 | May | |
| 5,558,700 A | 9/1996 | Shibahashi et al. | |
| 5,591,255 A | 1/1997 | Small et al. | |
| 5,858,914 A * | 1/1999 | Shibahashi .......... | A43B 1/0036 36/100 |
| 5,997,849 A | 12/1999 | Small et al. | |
| 6,139,779 A | 10/2000 | Small et al. | |
| 6,494,950 B1 | 12/2002 | Fujita et al. | |
| 7,351,362 B2 | 4/2008 | Yasuda et al. | |
| 7,494,537 B2 | 2/2009 | Ono et al. | |
| 2007/0113358 A1* | 5/2007 | Rabolt ................... | D01D 5/003 8/500 |
| 2007/0270773 A1 | 11/2007 | Mackey | |
| 2008/0279253 A1 | 11/2008 | MacDonald et al. | |
| 2008/0289535 A1 | 11/2008 | Spector | |

OTHER PUBLICATIONS

PCT/US2014/042991, International Search Report & Written Opinion mailed Oct. 16, 2014, 10 pages.

* cited by examiner

*Primary Examiner* — Bruce H Hess
(74) *Attorney, Agent, or Firm* — Craig R. Miles; CR Miles P.C.

(57) ABSTRACT

An article of clothing is coated or impregnated with a coating that contains thermochromic pigment. The pigment is constructed to change color when wet with water, and/or to provide a hyperthermic warning when a person wearing the clothing is over-warm.

20 Claims, 2 Drawing Sheets

WATER-ACTIVATED THERMOCHROMIC MATERIALS

RELATED APPLICATIONS

This application claims the benefit of priority of U.S. Provisional Application Ser. No. 61/836,563, filed Jun. 18, 2013, which is incorporated herein by reference in its entirety.

BACKGROUND

1. Field of the Invention

The presently disclosed instrumentalities pertain to thermochromic pigments in materials and articles that may be worn by a person or applied to a substrate. In particular, the pigments have a color activation temperature ranging from about 40° C. to 45° C.

2. Description of the Related Art

Chemicals that change color over a range of temperatures are known as thermochromic systems. Thermochromic chemicals can be manufactured to have a color change that is reversible or irreversible. U.S. Pat. No. 5,591,255, entitled "Thermochromic Ink Formulations, Nail Lacquer and Methods of Use," issued Jan. 7, 1997, to Small et al., discloses methods of producing thermochromic coating formulations without ingredients known to be harmful to thermochromic inks. The use of distilled water as a fountain solution for off-set printing using thermochromic ink is also disclosed.

Thermochromic systems use colorants that are either liquid crystals or leuco dyes. Liquid crystals are used less frequently than leuco dyes because they are very difficult to work with and require highly specialized printing and handling techniques. Thermochromic pigments are a system of interacting parts. Leuco dyes act as colorants, while weak organic acids act as color developers. Solvents or waxes variably interact with the leuco dyes according to the temperature of the system. As is known in the art, thermochromic systems are microencapsulated in a protective coating to protect the contents from undesired effects from the environment. Each microcapsule is self-contained, having all of the components of the entire system that are required for the color change. The components of the system interact with one another differently at different temperatures. Generally, the system is ordered and colored below a temperature corresponding to the full color point. The system becomes increasingly unordered and starts to lose its color at a temperature corresponding to an activation temperature.

Below the activation temperature, the system is usually colored. Above the activation temperature the system is usually clear or lightly colored. The activation temperature corresponds to a range of temperatures at which the transition is taking place between the full color point and the clearing point. Generally, the activation temperature is the temperature at which the human eye can perceive that the system is starting to lose color, or alternatively, starting to gain color. Presently, thermochromic systems are designed to have activation temperatures over a broad range, from about −20° C. to about 80° C. or more. With heating, the system becomes increasingly unordered and continues to lose color until it reaches a level of disorder at a temperature corresponding to a clearing point. At the clearing point, the system lacks any recognizable color.

In this manner, thermochromic pigments change from a specific color to clear upon the application of thermal energy or heat in a thermally-driven cycle exhibiting well-known hysteresis behavior. Thermochromic pigments come in a variety of colors. When applied to a substrate, such as paper, the pigment exhibits the color of the dye at the core of the microcapsules. In one example, when heat is applied generally in the range of 30 to 32° C., the ink changes from the color of the pigment to clear. When the substrate is allowed to return to a temperature under approximately 30° C., the ink returns to the original color of the pigment.

Temperature changes in thermochromic systems are associated with color changes. If this change is plotted on a graph having axes of temperature and color, the curves do not align and are offset between the heating cycle and the cooling cycle. The entire color versus temperature curve has the form of a loop. See generally FIG. 1 where the extent of color change presents a gap 100 that differs between color change that occurs upon heating 102 to an ultimate clearing point 104 versus cooing 106 to an ultimate full color point 108. This shows that the color of a thermochromic system does not depend only on temperature, but also on the thermal history, i.e. whether the particular level of color was reached during heating or during cooling. This phenomenon is generally referred to as a hysteresis cycle and specifically referred to herein as color hysteresis or the hysteresis window. Decreasing the width of this hysteresis window to approximately zero allows for a single value for the full color point and a single value for the clearing point. This would allow for a reliable color transition to be observed regardless of whether the system is being heated or cooled.

Prior art reveals that the color transition range of microencapsulated thermochromic systems may be adjusted by shifting the full color point upward toward the clearing point, or shifting the clearing point downward toward the full color point, as explained in U.S. Pat. No. 6,494,950. These shifts are accomplished by adding high melting point materials to increase the full color point or, alternatively, by adding low melting point materials to the system to decrease the clearing point. Thus, the full color point or clearing point may be lowered or raised, but the overall temperature range between the two points remains unchanged because the amount of separation or width across the hysteresis window is left largely unaffected.

Specific thermochromic coating formulations are known in the art. See, for example, U.S. Pat. Nos. 4,720,301, 5,219, 625, 5,558,700, 5,591,255, 5,997,849, 6,139,779, 6,494,950 and 7,494,537, all of which are expressly incorporated herein by reference. These thermochromic coatings are known to use various components in their formulations, and are generally reversible in their color change. Thermochromic; pigments for use in these coatings are commercially available in various colors, with various activation temperatures, clearing points and full color points. Thermochromic coatings may be printed by offset litho, dry offset, letterpress, gravure, flexo and screen processes, among other techniques Microencapsulated thermochromic pigments may be formulated on commercial order and incorporated in coatings that change color in response to changes in temperature. By way of example, U.S. Pat. No. 5,281,570, issued to Hasegawa et al., teaches how to form microencapsulated thermochromic pigments that may be used directly or microencapsulated. The microencapsulated system is preferred and includes a leuco dye system that is mixed with longer chain alcohols, caprates, stearates, palmitates, etc., that are selected for melting point to control the color transition temperature of the pigments. These materials form the core of a microcapsule that may be microencapsulated by a wall of resin, such as an amine resin. Microencapsulated thermochromic pigments having a variety of colors and color transition temperatures may be purchased on commercial order from suppliers, such as Chromatic Technologies, Inc. of Colorado Springs, Colo.

SUMMARY

The presently disclosed instrumentalities advance the art by providing articles of clothing that are made of fabric which have been coated or impregnated with thermochromic pigment. It is particularly useful that the pigment is constructed such that the pigment changes color in response to cooling that results from the fabric being wet with water, and/or upon heating that dries the fabric after the fabric is wet with water. Alternatively, providing the pigment with an even greater clearing point provides an indicator of hyperthermic risk.

In one aspect, the application of water to a pigment with full color point (FC) of preferably from 13° C. to 19° C. and more preferably from 17° C. to 18° C., so that the clothing article will only appear in the colored state when cooled by the effect of cold water. In another aspect, when worn on the body in a dry condition, the thermochromic pigment will not be color activated if it is at a temperature above the clearing point which is preferably from about 23° C. to 26° C., which may be achieved by drying the clothing article after it is wet. The color change may indicate continuing wetness, for example, in a sporting context, or as an indicator of hypothermic risk.

In one aspect, heating of a pigment with a higher clearing point (CP) 40° C. to 45° C. indicates hyperthermic risk, such as a warning or hyperthermia or of a need for hydration or a hyperthermia indicator.

The thermochromic pigment may be mixed with a non-thermochromic material such that there is a blending of colors or a background color.

In one aspect, the thermochromic pigments may be incorporated in an adhesive cloth or a face paint that may be applied to the body to indicate degrees of heat stress. This may be, for example, a wax (beeswax) color stick with pigment that transitions form black to non-black in color. The thermochromic materials may also be incorporated as a design on a Band-Aid® type of strip.

In one example, blue thermochromic pigment with a clearing point from 40° C. to 45° C. blue is mixed with a pink and yellow pigmented base coat to form a black to orange coating. These materials are available for mixture in various formulations on commercial order from CTI.

In one embodiment, an adhesive tape is manufactured with a thermochromic coating over an image or text that informs a consumer to drink a particular beverage when the consumer sweats to produce a cooling action upon the thermochromic coating. The image or text is not limited to a beverage, but any advertising may suffice, such as advertising for sports teams, military, children's products, or extreme exercise.

In one aspect, the formulations may be provided for fair skinned people to use bright colors and dark-skinned people to use contrasting colors, such as orange, yellow or pink.

In particular, a water activated polyurethane vehicle ink with a tetradecanol has a full color point of from FC 17° C. to 18° C. This develops color sharply when wet with water and has no color at room temperature. Clothing and other materials that may be color-activated when wet with water and which incorporates this pigment include, for example, t-shirts, screen-printed designs, pants, hats, super-soaker game wear, and packaging To remove the color and erase the image, dry t-shirts in home laundry cycle drier, use hair dryer or expose to gentle heat source to dry body wear.

DETAILED DESCRIPTION

Figure 1:
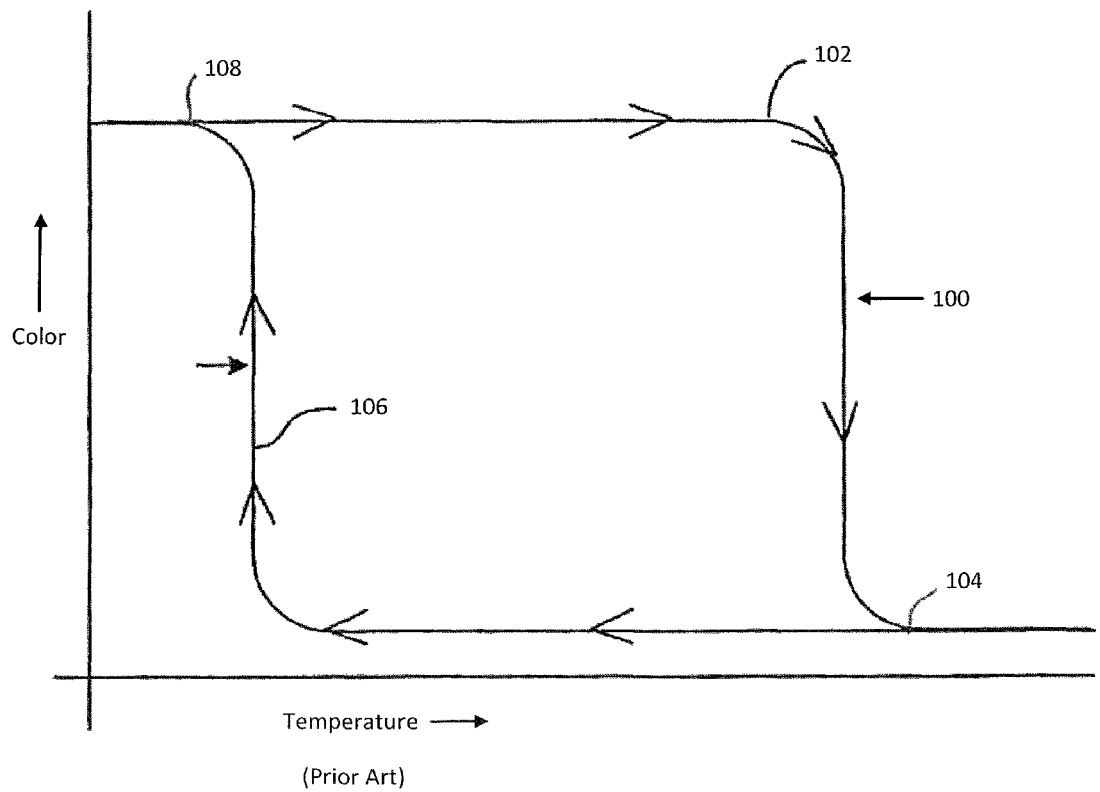
FIG. 1 shows a hysteresis curve according to the prior art.
Figure 2:
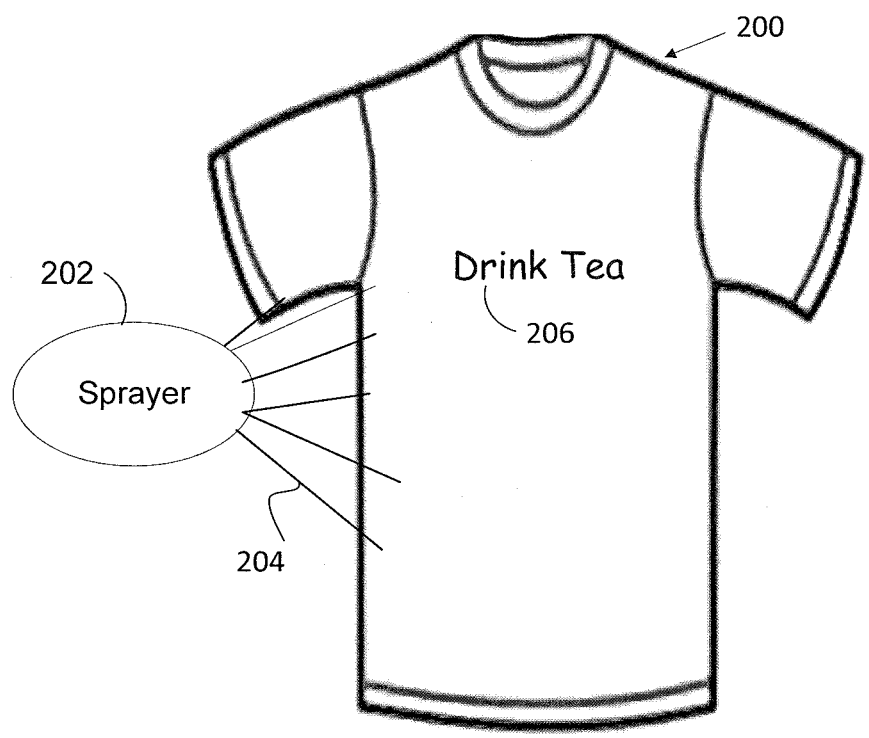
FIG. 2 shows a shirt made of fabric that has been coated with a coating which contains a thermochromic pigment.

FIG. 2 shows a shirt 200 that may be a cotton T-shirt or another type of shirt made out of any fabric. It will be appreciated that the instrumentalities shown herein may utilize any type of clothing, such as pants, gloves, hats, socks, or undergarments. As shown in FIG. 2, a sprayer 202 is applying coating 204 that contains a thermochromic pigment. This coating 204 becomes permanent when dried on shirt 200. Any mode of application may be used, such as screen printing or saturation on a vat. The shirt 200 has an optional message 206, in this case "Drink Tea." This message 206 is hidden or concealed when the coating 204 on shirt 200 has developed full color.

Figure 3:
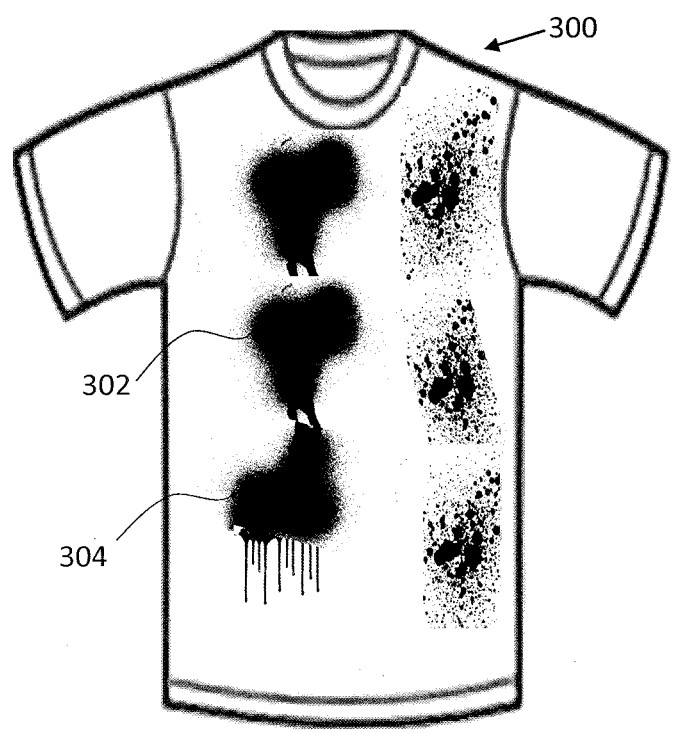
FIG. 3 shows the shirt of FIG. 2 in a state that is partially wet with water to induce cooling that results in a visible color change.

The thermochromic pigment of coating 206 may have, for example, full color development (FC) at 17° C. to 18° C. This type of pigment may be color-activated by the use of water, for example, from a hose, squirt gun, water balloon, or other source of water. The color change may facilitate creative games played, such as pretend war, cops and robbers, and other games. By way of example, a squirt gun can make marks appear, such as red for blood or green for alien blood. A variety of colors can be used for Team games. This is a low cost and clean alternative to paint ball games. Thus, FIG. 3 shows shirt 300, which has been with thermochromic pigment in like manner with respect to shirt 200. Shirt 300 has been wet by use of a squirt gun to product indicia of 'hits' 302, 304. If the wearer would jump into a body of water, such as a swimming pool, shirt 300 would entirely change to the color of hits 302, 304.

The indicia 206 may contain an advertisement or warning that reveals as a person perspires or as the shirt 200 dries after being wet. Thus, interactive exercise wear may show the level of physical activity by turning color or revealing messages or graphics as the person perspires. This happens because evaporative cooling activates the body wear. By way of example, multiple thermochromic pigments and non-thermochromic pigments may be combined to produce color changes with various meanings: Black that clears to reveal an orange background may be used to communicate a warning to rehydrate. Where yellow thermochromic pigment in the orange clears at a slightly higher temperature to show as red, this may indicate a more serious hyperthermic warning (CP40-CP45) that an athlete needs to take a break. Alternatively, the pigment may function as a hypothermia indicator when it has a full color point of FC8-FC12.

The coating 204 is preferably water-activated to produce a color change by thermochromic action. This action depends on a reduction from ambient temperature to an activation temperature to effect the color change. When water evaporates, the heat loss from the transition from liquid to gas sufficiently reduces the temperature to activate the thermochromic microcapsules.

The thermochromic pigments may be commercially ordered such that the activation temperature is engineered to occur from 13° C. to 19° C., so that the clothing article will only appear in the colored state when cooled by the effect of cold water. In another aspect, when worn on the body in a dry condition, the thermochromic pigment will not be color activated if it is at a temperature above the clearing point which is preferably from about 23° C. to 26° C.

With these parameters built into the thermochromic pigment, cold water below the full color point (activation temperature) is observed to produce a dramatic and immediate color change. Warmer water that cools the fabric via evaporation causes a delayed color change to occur over a period of about 1-3 minutes. The color development may take several minutes for the evaporative cooling process to cool the dyed fabric to its activation temperature.

Once the color is developed, the hysteresis effect or 'memory' in the thermochromic system permits the color development to persist until the fabric becomes dry. The wearer's body temperature accelerates the drying of the fabric.

The thermochromic shirts with this temperature profile have many uses. These may include, for example, exercise wear that changes color when the wearer sweats and then cools down causing evaporative cooling to occur. In another application, "water tag" is played with water guns just as paintball making it a safe and fun activity even for younger children. Safety equipment is not needed.

Artistic fashion wear may be painted with water. Multiple colors and images can be applied to the shirt via airbrushing, or the shirt may be tie-died to produce multiple colors when activated.

Promotional wear may be worn at water parks as swim wear or t shirts. Images or design changes will appear when the shirt becomes wet.

The thermochromic pigment is preferably mixed with a commercially available coating to achieve a desired color density and permanently affix the microencapsulated pigment to fabric. Coatings in the class of polyurethane binders are particularly preferred. This method of dying allows the fabric to possess extreme durability and withstand multiple washings without dramatic color loss. This dying process allows adhesion to natural fabrics like cotton, but also to synthetic fibers such as polyesters. The colors are bright and vivid when fully developed.

A variety of colors and color to color options are available from known leuco dye systems. Microencapsulated thermochromic pigments using these leuco dye systems may be used in combination with other dyes or pigments, such as fluorescent dyes or normal (nonfunctional) pigments or dyes. Thermochromically-driven color options include, for example;

Purple
Blue
Teal
Aqua
Red
Orange
Green
Black
Brown
Magenta
Orange to Yellow
Green to Yellow
Black to Orange, Green, or Pink
Purple to Pink
Red to Blue Those skilled in the art will appreciate that what is shown and described herein may be subjected to insubstantial changes without departing from the true scope and spirit of the invention. Accordingly, the inventors state their intent to rely upon the Doctrine of Equivalents in protecting their full rights in the invention.

We claim:

1. A method of using a thermochromic pigment to indicate an interaction with a fluid, said method comprising:
   providing a wearable article including said thermochromic pigment which changes color upon exposure to a temperature less than an activation temperature; and
   cooling said wearable article to said temperature less than said activation temperature by said interaction with said fluid, thereby changing said color of said thermochromic pigment.

2. The method of claim 1, wherein said interaction with said fluid comprises contacting said wearable article and correspondingly, said thermochromic pigment, with said fluid which is cooled to said temperature less than said activation temperature.

3. The method of claim 2, wherein said fluid comprises water.

4. The method of claim 2, wherein said thermochromic pigment is colored upon exposure to said fluid which is cooled to said temperature less than said activation temperature.

5. The method of claim 4, wherein said activation temperature is less than about 19° Celsius.

6. The method of claim 4, wherein the color change upon exposure to said fluid which is cooled to said temperature less than said activation temperature is reversible.

7. The method of claim 6, wherein said thermochromic pigment loses its color upon exposure to a temperature greater than said activation temperature.

8. The method of claim 6, wherein said thermochromic pigment is substantially colorless upon exposure to a temperature greater than a clearing point temperature.

9. The method of claim 8, wherein said clearing point temperature is greater than about 23° Celsius.

10. The method of claim 2, wherein said thermochromic pigment is encapsulated within a microcapsule.

11. The method of claim 2, further comprising using said thermochromic pigment to indicate being contacted by said fluid which is cooled to said temperature less than said activation temperature as an alternative to paintball.

12. The method of claim 1, wherein said interaction with said fluid comprises evaporative cooling resulting from evaporation of said fluid which is proximate said wearable article and correspondingly, said thermochromic pigment;
    wherein said evaporative cooling provides said temperature less than said activation temperature.

13. The method of claim 12, wherein said fluid comprises perspiration.

14. The method of claim 12, wherein said thermochromic pigment is colored upon said evaporative cooling which provides said temperature less than said activation temperature.

15. The method of claim 14, wherein said activation temperature is less than body temperature.

16. The method of claim 14, wherein the color change upon said evaporative cooling which provides said temperature less than said activation temperature is reversible.

17. The method of claim 16, wherein said thermochromic pigment loses its color upon exposure to a temperature greater than said activation temperature.

18. The method of claim 16, wherein said thermochromic pigment is substantially colorless upon exposure to a temperature greater than a clearing point temperature.

19. The method of claim 18, wherein said clearing point temperature is greater than body temperature.

20. The method of claim 12, wherein said thermochromic pigment is encapsulated within a microcapsule.

* * * * *